United States Patent [19]

Fujita

[11] Patent Number: 5,331,350
[45] Date of Patent: Jul. 19, 1994

[54] IMAGE PROCESSING APPARATUS AND METHOD USING TIME BASE MODULATION TO GIVE MOTION TO AN ARBITRARY IMAGE

[75] Inventor: Shinichi Fujita, Kanagawa, Japan

[73] Assignee: Sony Corporation, Tokyo, Japan

[21] Appl. No.: 957,893

[22] Filed: Oct. 8, 1992

[30] Foreign Application Priority Data

Oct. 14, 1991 [JP] Japan .................................. 3-292009

[51] Int. Cl.⁵ .............................................. H04N 9/74
[52] U.S. Cl. ..................................... 348/578; 348/571
[58] Field of Search .................... 358/22, 160; 382/41, 382/44–47; 395/118, 127, 129, 133, 138; 348/571, 578; H04N 9/74

[56] References Cited

U.S. PATENT DOCUMENTS

| 4,472,732 | 9/1984 | Bennett et al. ............... 358/22 X |
| 4,602,285 | 7/1986 | Beaulier et al. ................ 358/22 |
| 4,860,217 | 8/1989 | Sasaki et al. ................... 382/44 |
| 4,916,540 | 4/1990 | Kosaka ......................... 358/160 |

Primary Examiner—Mark R. Powell
Assistant Examiner—John W. Miller
Attorney, Agent, or Firm—William S. Frommer; Alvin Sinderbrand

[57] ABSTRACT

In an image processing apparatus adapted for imparting motion or movement to an input image according to this invention, position data indicating positions of an image in respective key frames are stored to form, by interpolation processing, locus data indicating a movement path of the input image on the basis of the position data and modulated time data subjected to modulation in a time base direction to implement motion or movement processing of the input image on the basis of the locus data.

4 Claims, 5 Drawing Sheets

IMAGE PROCESSING APPARATUS AND METHOD USING TIME BASE MODULATION TO GIVE MOTION TO AN ARBITRARY IMAGE

FIELD OF THE INVENTION

This invention relates to an image processing apparatus adapted to give motion to an arbitrary image, and more particularly to an image processing apparatus capable of carrying out effective editing when connected to video editing equipment, and the like.

DESCRIPTION OF THE PRIOR ART

Heretofore, there is known an image processing apparatus capable of carrying out key frame processing which is a process in which frame points are set at arbitrary plural frame intervals to move an image so that it passes through these frame points.

Figure 1:
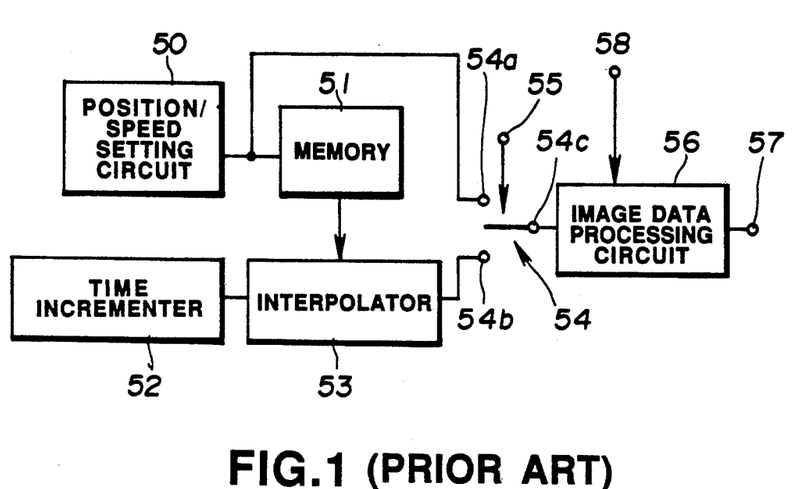
FIG. 1 is a block diagram showing an example of a conventional image processing apparatus.

As a conventional image processing apparatus of this kind, an apparatus as shown in FIG. 1 has been proposed, for example, comprising a position/speed setting circuit 50 adapted for setting positions through which an image is passed after an abitrarily selected number of frames, i.e., frame points, and for setting speeds of image movement between respective frame points; a memory 51 for storing position data indicating positions through which the image is passed and speed data indicating speeds of image movement, which are set by the position/speed setting circuit 50; a time incrementing circuit or incrementer 52 for outputting time data at fixed intervals; an interpolation circuit or interpolator 53 for forming, by interpolation processing, locus data indicating passing or transit positions of the image between respective frame points in dependency upon the time data from the time incrementer 52 and the position data and speed data read out from the memory 51; a selector switch 54 for carrying out switching between a setting mode for setting positions through which an image is passed and moving speeds thereof and an execution mode for moving that image to a desired position and at a desired speed set at the time of the setting mode, and an image data processing circuit 56 for carrying out processing of image data corresponding to a mode selected by the selector switch 54.

The operation of the conventional image processing apparatus thus constructed will now be described.

First, a user operates, in order to set positions through which the image is passed and moving speeds thereof, a setting/execution selector switch (not shown) thus to select the setting mode. Thus, data indicating that the image processing apparatus is in the setting mode is delivered to the selector switch 54 through an input terminal 55.

The selector switch 54 selects a terminal 54a by a selecting terminal 54c when the data indicating that the apparatus is in the setting mode is delivered to the selector switch 54.

The user then operates the position/speed setting circuit 50 to set positions at arbitrarily selected plural frame intervals of an image caused to move on a displayed picture and speeds for moving that image. Thus, data indicating positions at arbitrarily selected plural frame intervals of an image caused to move on the displayed picture and data indicating moving speeds of the image are delivered to the memory 51 respectively as position data and speed data, and are also delivered to the image data processing circuit 56 through the selector 54.

When the apparatus is in the setting mode, it is preferable to carry out setting of position data and speed data while looking at those data set on a display means such as a monitor device, etc. To realize this, the image data processing circuit 56 implements data processing required when the apparatus is in the setting mode using the position data and the speed data delivered from the position/speed setting circuit 50 to deliver those processed data to the monitor device through an output terminal 57.

Figure 2:
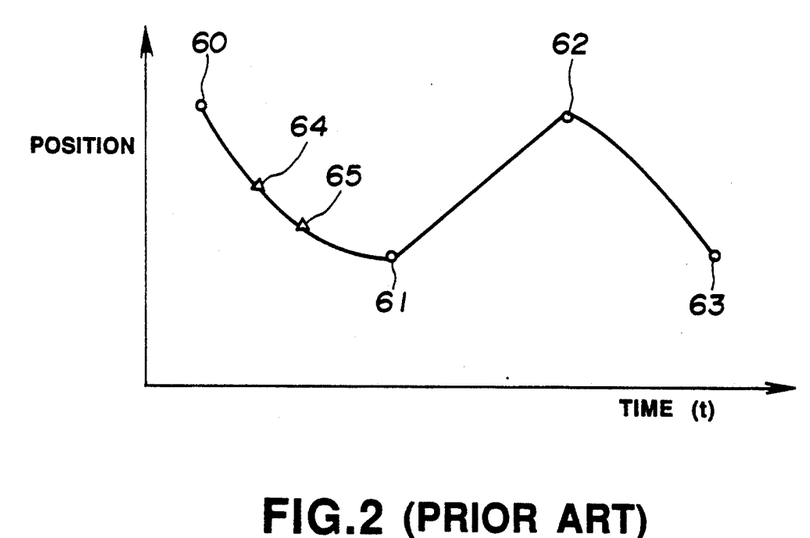
FIG. 2 is a schematic diagram for explaining the operation of the image processing apparatus shown in FIG. 1.

While looking at a picture displayed on the monitor device, the user sets, as indicated by frame points 60~63 of FIG. 2, for example, positions through which an image is to pass over a plurality of frames, and further sets moving speeds of that image between the frame points 60 and 61, between the frame points 61 and 62, and between the frame points 62 and 63. Between the frame points 60 and 61, a plurality of frames exist in a time base direction.

The positions through which the image is passed, set by using the frame points 60~63, and the moving speeds of that image set for each section between respective frame points are stored in the memory 51 respectively as position data and speed data.

When the positions through which the image is passed and moving speeds of the image are set in this way, the user then operates the setting/execution selector switch to select the execution mode. Thus, data indicating that the apparatus is in the execution mode is delivered to the selector switch 54 through the input terminal 55.

The selector switch 54 selects a terminal 54b by the selecting terminal 54c when data indicating that the apparatus is in the execution mode is delivered to the selector switch 54.

When the operational mode of the apparatus shifts to the execution mode, time data are provided each unit of time from the time incrementer 52, and the position data and the speed data stored at the time of the above-described setting mode are read out from the memory 51. The time data, the position data and the speed data are delivered to the interpolator 53.

This interpolator 53 generates, by interpolation, locus data indicating passing or transit positions of an image for a time period from the frame where the frame point 60 is provided to the frame where the frame point 61 is provided, as shown in FIG. 2, for example, in dependency upon the time data, the position data and the speed data, and similarly generates, by interpolation, locus data indicating passing or transit positions of an image for a time period from the frame where the frame point 61 is provided to the frame where the frame point 62 is provided, thus to output those locus data. Such locus data are delivered to the image data processing circuit 56 through the selector switch 54.

The image data processing circuit 56 implements data processing of image data input from a terminal 58 on the basis of the locus data to deliver the processed data to the monitor device through the output terminal 57.

Thus, an image is displayed in such a manner that it moves at respective set speeds along the locus indicated by the frame points 60~63 of FIG. 2.

Now in the case where the speed of image movement is desired to be altered at a portion between the frame points 60 and 61 shown in FIG. 2, for example, the user selects the setting mode for a second time to newly set frame points 64 and 65. If setting is now assumed to be made such that it takes 10 seconds for movement of image between frame points 60 and 61, for example, a new setting is made such that it takes 4 seconds for movement of image between the frame points 60 and 64, that it takes 2 seconds for movement of image between the frame points 64 and 65, and that it takes 4 seconds for movement of image between the frame points 65 and 61.

Thus, an image displayed on the monitor device is displayed in such a manner that it moves slowly between the frame points 60 and 64, and moves rapidly between the frame points 64 and 65, and moves slowly for a second time between the frame points 65 and 61.

However, in the conventional image processing apparatus, in the case of attempting to alter the speed of an image for a portion of a section set in advance, it is necessary to newly provide a frame point or points within the section as described above to carry out resetting of a speed or speeds within the section for a second time. This has been very troublesome.

Further, if a new frame point or points are supplemented in this way, this would constitute an obstacle to interpolation of locus data in the interpolator 53. As a result, it could not be said that an expected effect is necessarily provided.

Even if alteration of the speed as described above is carried out, since speeds between the frame points 60 and 64, between the frame points 64 and 65, and the frame points 65 and 61 are respectively constant values, an image displayed on the basis of such data is monotonous from a visual point of view.

OBJECT

A principal object of this invention is to provide an image processing apparatus having a higher degree for freedom of setting the speed at which an image moves, and capable of setting an image speed so that an image can move at a desired speed on a desired locus in a short time.

SUMMARY OF THE INVENTION

To achieve the above object, in accordance with this invention, there is provided an image processing apparatus adapted for rendering motion or movement to an input image, position setting means for outputting position data indicating positions of an image in respective key frames; memory means for storing position data delivered from the position setting means; time data generator means for outputting time data; time base modulator means for modulating time data delivered from the time data generator means; interpolator means for forming, by an interpolation process, locus data indicating a movement path of the input image on the basis of the position data stored in the memory means and the time data delivered from the time base modulator means; and image data processing means for implementing motion processing of the input image on the basis of the locus data delivered from the interpolator means.

Preferably, a function pattern or patterns indicating a change in the speed of movement of an image may be preset in advance in the time base modulator means.

In addition, the image data processing means may implement motion or movement processing of the input image on an equidistant time base on the basis of locus data delivered from the interpolator means.

DESCRIPTION OF THE PREFERRED EMBODIMENT

An embodiment of an image processing apparatus according to this invention will now be described with reference to the attached drawings.

Figure 3:
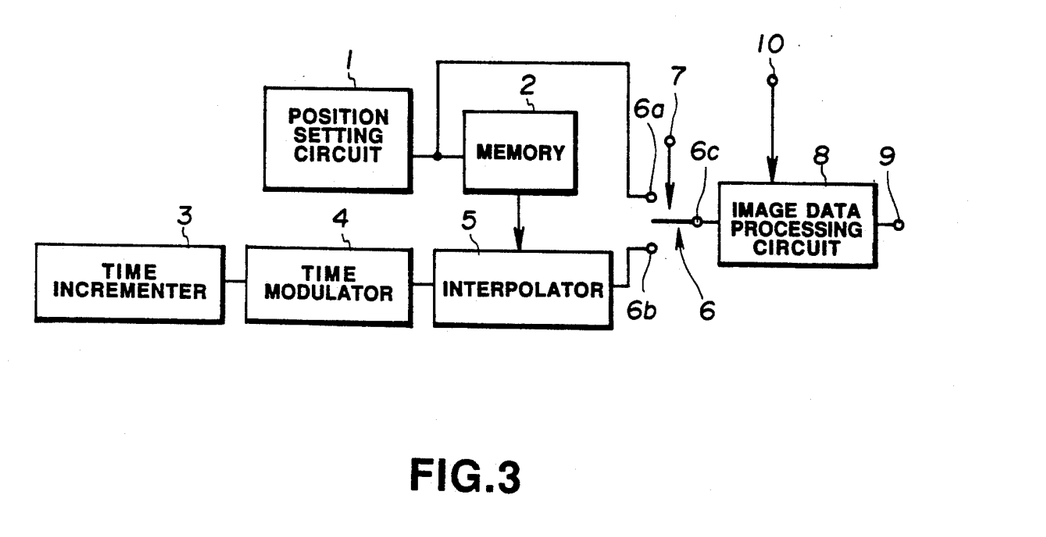
FIG. 3 is a block diagram showing an embodiment of an image processing apparatus according to this invention.

The image processing apparatus of this embodiment comprises, as shown in FIG. 3, for example, a position setting circuit 1 serving as position setting means adapted to output position data for designating positions in key frames for predetermined times of an image caused to move in a displayed picture; a memory 2 serving as memory means for storing position data from the position setting circuit 1; a time incrementer 3 serving as time data generator means (operative as a sort of a timer) for outputting time data each unit of time; a time modulator 4 serving as time base modulator means adapted to implement modulation of the time data in dependency upon an arbitrary function pattern to output expanded or contracted time data; an interpolator 5 serving as interpolator means adapted to form locus data indicating a locus of movement of the image by an interpolation process in conformity with the position data from the memory 2 and the time modulated data from the time modulator 4; a selector switch 6 adapted to selectively output position data from the position setting circuit 1 and locus data from the interpolator 5 in dependency upon whether the apparatus is in the setting mode or the execution mode which will be described later; and an image data processing circuit 8 serving as image data processing means adapted to implement predetermined image data processing based on position data or locus data output through the selector switch 6 in dependency upon a selected mode to output the processed data.

The operation of the image processing apparatus constructed as described above will now be described.

First, a user operates a setting/execution selector switch (not shown) in order to set passing or transit positions of an image and moving speeds thereof to select the setting mode. Thus, data indicating that the apparatus is in the setting mode is delivered to the selector switch 6 through the input terminal 7.

The selector switch 6 selects a terminal 6a by means of a select terminal 6c when data indicating that the apparatus is in the setting mode is delivered to the selector switch 6.

The user then operates the position setting circuit 1 to set position data indicating positions in key frames at predetermined times of an image caused to move on a displayed picture. The data indicating positions in key frames every predetermined time caused to move on the picture displayed is delivered as position data to the memory 2, and is delivered to the image data processing circuit 8 through the selector switch 6.

When the apparatus is in the setting mode, it is preferable to carry out setting of position data while looking at those data set on the display means such as a monitor device, etc., To realize this operation, the image data processing circuit 8 implements data processing required when the apparatus is in the setting mode based on the position data delivered from the position setting circuit 1 to deliver such processed position data to the monitor device through an output terminal 9.

Figure 4:
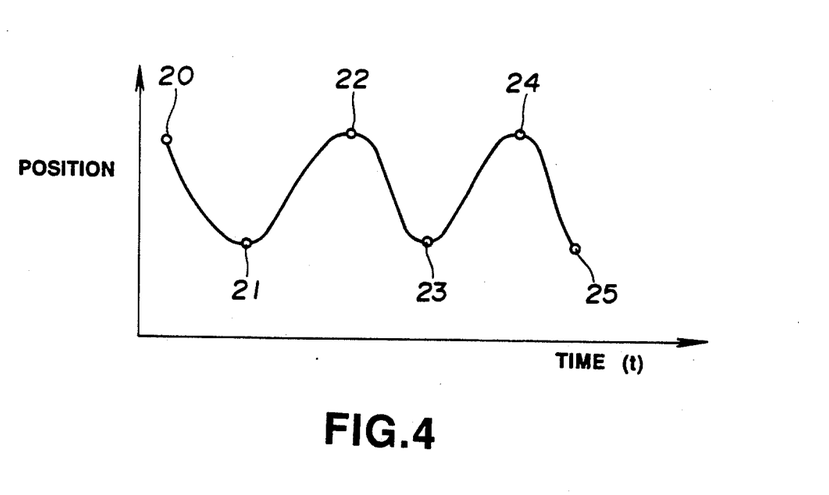
FIG. 4 is a schematic diagram for explaining an operation for setting key frame points in the image processing apparatus shown in FIG. 3.

The user sets frame points 20~25 serving as passing or transit, points through which of an image moves over a plurality of frames, as shown in FIG. 4, for example, while looking at a picture displayed on the monitor device. The position data set as the frame points 20~25 are delivered to the memory 2 and are stored therein. Between the frame points 20 and 21, between the frame points 21 and 22, between the frame points 22 and 23, between the frame points 23 and 24, and between the frame points 24 and 25, a plurality of frames respectively exist in a time base direction.

The user then sets the speed at which the image moves by using the time modulator 4.

As shown in FIGS. 5(a)~5(e), for example, a plurality of function patterns indicating changes in the moving speed of an image are prepared in advance, e.g., by software program, and are stored in the time modulator 4. In FIGS. 5(a)~5(e), the solid lines p represent distances through which an image moves, and the dotted lines V represent speeds at which the image moves. The time modulator 4 contracts or expands the time base of time data delivered from the time incrementer 3 when the apparatus is in the execution mode in accordance with a preselected function showing a change in the speed of image movement to deliver it to the interpolator 5.

Figure 5A:
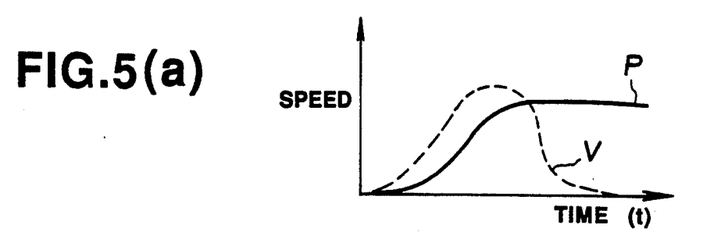
FIGS. 5a to 5e are schematic diagrams for explaining one example of an operation for setting speeds at which an image moves in the image processing apparatus shown in FIG. 3.
Figure 5B:
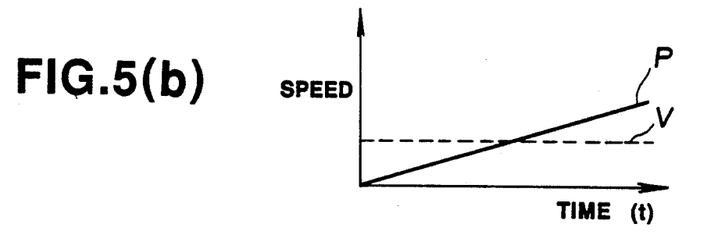

The function pattern shown in FIG. 5(a) (first function pattern) is a function pattern selected in the case where an image moves in such a manner that the speed of movement gradually increases at the beginning, has a peak value in the middle, and gradually decreases after the peak. Further, the function pattern shown in FIG. 5(b) (second function pattern) is a function pattern selected in the case where the image moves at a fixed speed from the beginning to the last.

Figure 5C:
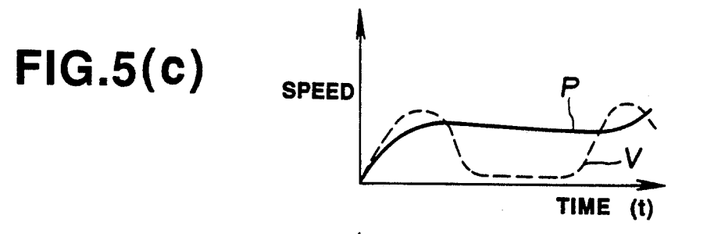
Figure 5D:
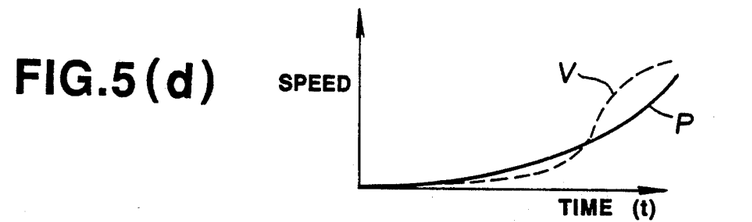
Figure 5E:
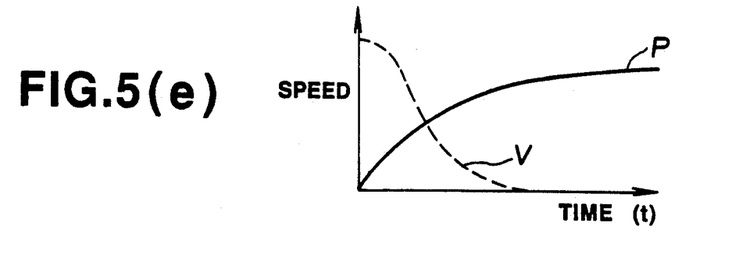

The function pattern shown in FIG. 5(c) (third function pattern) is a function pattern selected in the case where the image moves in such a manner that its speed of movement abruptly increases at the beginning, abruptly decreases in the middle, and abruptly increases for a second time during a final interval. Moreover, the function pattern shown in FIG. 5(d) (fourth function pattern) is a function pattern selected for moving the image in such a manner that its speed of movement gradually increases to a peak value. In addition, the function pattern shown in FIG. 5(e) (fifth function pattern) is selected for moving the image so that its speed of movement has a peak value at the beginning and gradually decreases thereafter.

Figure 6A:
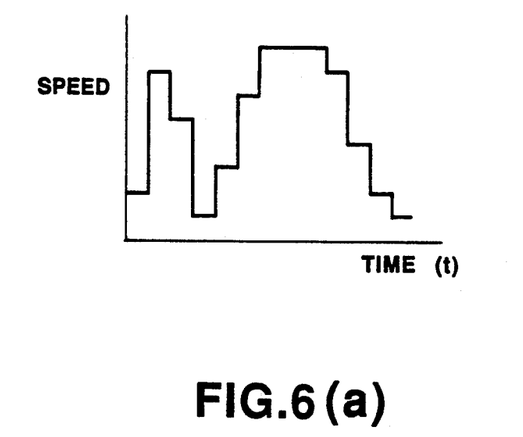
FIGS. 6a and 6b are schematic diagrams for explaining another example of the operation for setting the speeds of an image in the image processing apparatus shown in FIG. 3.
Figure 6B:
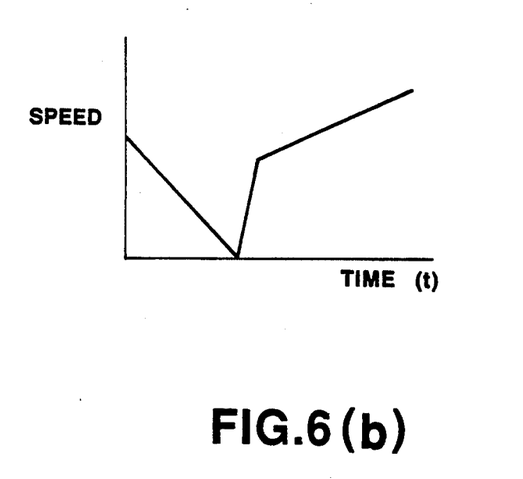

It is to be noted that while the function patterns shown in FIG. 5 are continuous stair-steps function patterns may be instead used as shown in FIG. 6(a) and 6(b), for example, for this purpose.

The user selects from the function patterns such that, e.g., the first function pattern is caused to be applied or adapted for the portion between frame points 20 and 21, the second function pattern is caused to be applied for the portion between frame points 21 and 22, the third function pattern is caused to be applied for the portion between the frame points 22 and 23, the fourth function pattern is caused to be applied for the portion between the frame points 23 and 24, and the fifth function pattern is caused to be applied for the portion between the frame points 24 and 25, etc. to thereby determine the speeds at which the images move.

It is to be noted that the selected function pattern is such that the degree of rise and fall of speed curves as indicated by dotted lines in FIGS. 5a to 5e, for example, may be arbitrarily changed. For this reason, a large number of speed changes can be realized by using the same function pattern.

The function pattern arbitrarily selected and subjected to fine level adjustment is stored into the time modulator 4.

When settings of the passing or transit positions of the image and the speeds of image movement are completed, the user then operates the setting/execution selector switch to select the execution mode. Thus, data indicating that the apparatus is in the execution mode is delivered to the selector switch 6 through the input terminal 7.

The selector switch 6 selects a terminal 6b by means of the select terminal 6c when the data indicating that the apparatus is in the execution mode is delivered to the selector switch 6.

When the operational mode of the apparatus shifts to the execution mode, time data is output every unit time from the time incrementer 3, and the position data stored at the time of the setting mode is read out from the memory 2 and is delivered to the interpolator 5.

The time modulator 4 modulates the time data delivered from the time incrementer 3 in accordance with the selected function pattern to form time modulated data to deliver it to the interpolator 5.

The interpolator 5 generates, by interpolation, position data for a time period from the frame where the frame point 20 is provided to the frame where the frame point 21 is provided as shown in FIG. 4 in dependency upon the position data and the time modulated data; generates, by interpolation, position data for a time period from the frame where the frame point 21 is provided to the frame where the frame point 22 is provided; generates, by interpolation, position data for a time period from the frame where the frame point 22 is provided to the frame where the frame point 23 is provided; generates, by interpolation, position data for a time period from the frame where the frame point 23 is provided to the frame where the frame point 24 is provided; and generates, by interpolation, position data for a time period from the frame where the frame point 24 is provided to the frame where the frame point 25 is provided, thereby to form locus data indicating a locus of movement of the image to deliver it to the image data processing circuit 8 through the selector switch 6.

The operation of the image processing apparatus of this invention shown in FIG. 3 will now be described with reference to FIGS. 7A to 7D.

Figure 7A:
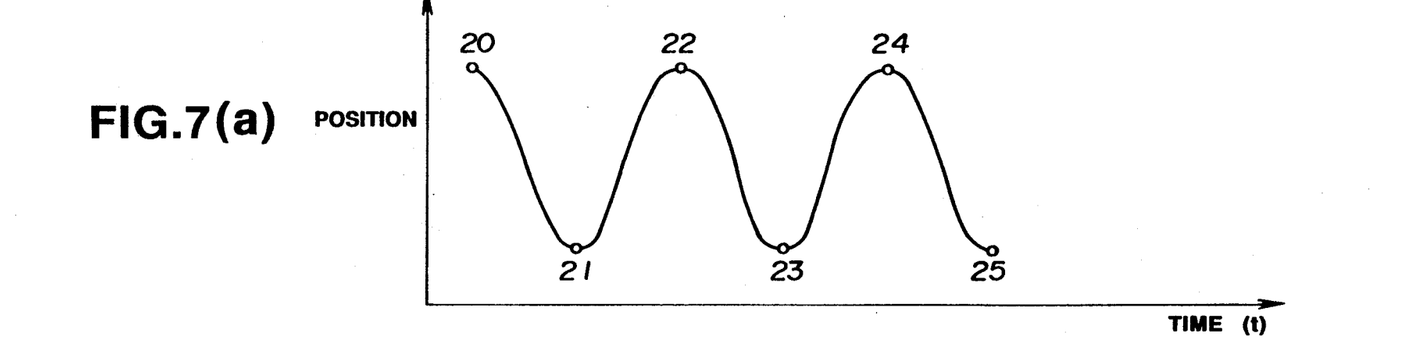
FIGS. 7A to 7D are schematic diagrams for explaining the operation of the image processing apparatus shown in FIG. 3.
Figure 7B:
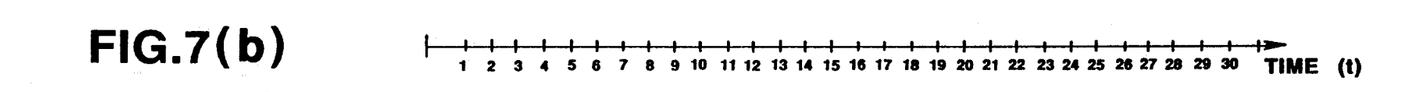
Figures 7C, 7D:
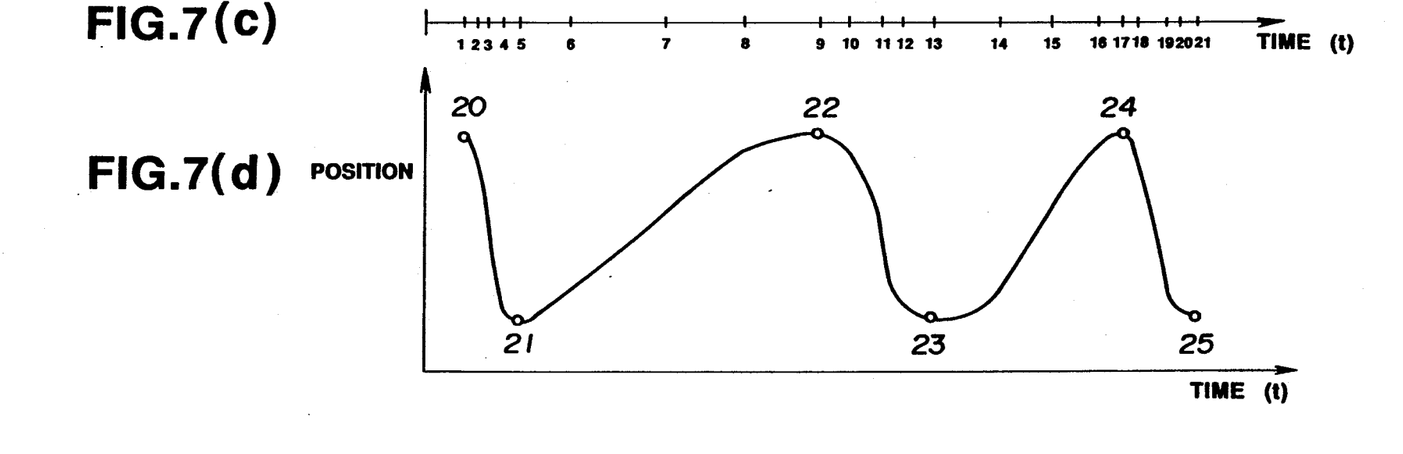

In the execution mode, data indicating positions of an image at key frame points 20, 21, 22, 23, 24 and 25 shown in FIG. 7A are read out from the memory 2 and are delivered to the interpolator 5. The time incrementer 3 generates equidistant time data shown in FIG. 7B to deliver this time data to the time modulator 4. The time modulator 4 contracts or expands the time base of time data delivered from the time incrementer 3 as shown in FIG. 7C, i.e., modulates time data, e.g., in accordance with function patterns shown in FIGS. 5(a) to 5(e) to deliver it to the interpolator 5. The interpolator 5 generates, by interpolation, locus data indicating positions of an image every frame as shown in FIG. 7D, on the basis of the position data indicating positions of the image at respective key frame points delivered from the memory 2 and the modulated time data delivered from the time modulator 4. This interpolator 5 uses modulated time data as a processing clock for interpolation processing. The image data processing circuit 8 implements signal processing to give motion or movement to an image signal input from a terminal 10 every frame with the equidistant time data, i.e., the time data shown in FIG. 7B serving as a processing clock on the basis of the locus data delivered from the interpolator 5 to deliver such processed time data to the monitor device through the output terminal 9. As stated above, while the interpolator generates locus data with the modulated time data serving as a processing clock, the image data processing circuit 8 uses time data which is not yet subjected to modulation as a processing clock. For this reason, the speeds at which the image moves between respective key frame points vary.

Thus, an arbitrary image is displayed on the monitor device along the locus indicated by frame points 20~25 of FIG. 4. Namely, for a time period from the frame where the frame point 20 is provided to the frame where the frame point 21 is provided, the image moves in such a manner that its speed of movement gradually increases at the beginning, reaches a peak value in the middle, and gradually decreases from the peak; for a time period from the frame where the frame point 21 is provided to the frame where frame point 22 is provided, the image moves at a fixed speed from beginning to end; for a time period from the frame where the frame point 22 is provided to the frame where the frame point 23 is provided, the image moves in such a manner that its speed abruptly increases at the beginning, abruptly decreases in the middle, and abruptly increases for a second time at the end; for a time period from the frame where the frame point 23 is provided to the frame where the frame point 24 is provided, the image moves in such a manner that its speed gradually increases, and reaches a peak value at the end; and for a time period from the frame where the frame point 24 is provided to the frame where the frame point 25 is provided, the image moves in such a manner that its speed has a peak value at the beginning and gradually decreases thereafter.

It is to be noted that, e.g., in the case of attempting to alter the speed of an image between respective frame points 20~21 shown in FIG. 4, this alteration can be carried out with ease simply by re-selecting a function pattern which is adapted for the section between the frame points 20 and 21 in the time modulator 4.

Further, since adjustment of the speed of the selected function pattern can be carried out by signal level adjustment, it is possible to conduct with ease fine adjustment of the moving speed of an image for the frames of a time period from one frame point to the subsequent frame point.

As is clear from the foregoing description, in accordance with the image processing apparatus according to this embodiment, the position setting circuit is constructed so that setting of passing or transit positions of an image can be carried out by using frame points. Further, the time modulator 4 is constructed so that a plurality of function patterns corresponding to moving speeds of an image are stored therein, and it is provided with a level adjustment capability for carrying out fine adjustment of the speeds of these function patterns. Accordingly, the time modulator 4 can select a desired one from the function patterns to carry out fine adjustment of the selected function by adjusting signal levels. Thus, by a simple operation to merely set a moving speed of the image, it is possible to easily conduct key frame processing such that an image moves at a speed corresponding to the selected function pattern so that the image passes through the frame points.

Further, since the speed of an image for a time period from a current or present frame point to a subsequent frame point is set by the function pattern, it is possible to carry out complicated speed changes for the image. Thus, any complicated effect can be provided also from a visual point of view.

It is to be noted that while it has been assumed in the above-described embodiment that first to fifth function patterns shown in FIGS. 5(a)~5(e) or stair-steps function patterns shown in FIGS. 6(a), 6(b) are provided in the time modulator 4, it is a matter of course that the function patterns employed are not limited to the above-described function patterns because it is possible to prepare various function patterns in addition to the above by programming arbitrary function patterns by software.

In the image processing apparatus according to this invention, position data for designating positions in key frames of an image caused to move on a picture displayed from the position setting means are stored in the memory means. Further, time data output every unit time from the time data output means are modulated by the time modulator means in dependency upon an arbitrary function pattern. The interpolator means carries out interpolation processing in accordance with the position data from the memory means and the time modulated data from the time modulator means, thus to form locus data indicating a locus of movement for the image.

Namely, by simply employing an approach to designate, by using the position setting means, positions in key frames of an image which is caused to move as a displayed picture to implement modulation based on the time data in dependency upon an arbitrary function pattern by using the time modulator means, it is possible to move an image to an arbitrarily selected position at an arbitrarily selected speed.

Further, since the speed at which an image moves is set by modulating time data in dependency upon an arbitrary function pattern by using the time modulator means, it is possible to carry out complicated speed changes to that image, thus to prevent monotony from a visual point of view.

In addition, since function patterns stored in the time modulator means are programmed by software in the embodiment of this invention, the kinds of function patterns can be increased with ease by preparing a new program, thus making it possible to give various speed changes to an image.

I claim:

1. An image processing apparatus for imparting movement to an input image comprising a plurality of frames, comprising:

position setting means for outputting position data indicating positions of an input image in respective key frames;

memory means for storing the position data output by said position setting means;

time data generator means for outputting time data representing a time base;

time base modulator means for modulating the time data delivered from said time data generator means such that the time base represented by the modulated time data varies in accordance with a predetermined function;

interpolator means for forming, by interpolation processing, locus data indicating a movement path of the input image on the basis of the position data stored in said memory means and the modulated time data delivered from said time base modulator means; and image data processing means for implementing movement processing of the input image on the basis of the locus data delivered from said interpolator means and a time signal representing a substantially unvarying time base.

2. An image processing apparatus as set forth in claim 1, wherein said predetermined function comprises at least one function pattern indicating a change of a moving speed of said input image are preset in advance in said time base modulator means.

3. A method for imparting movement to an image comprising a plurality of frames, comprising the steps of:

producing position data indicating positions of said image in respective key frames;

storing the position data;

producing time data representing a time base;

modulating the time data such that the time base represented by the modulated time data varies in accordance with a predetermined function;

forming, by interpolation processing, locus data indicating a movement path of the image on the basis of the stored position data and the modulated time data; and implementing movement processing of the input image on the basis of the locus data and a time signal representing a substantially unvarying time base.

4. The method of claim 3, wherein said predetermined function comprises at least one function pattern indicating a change of a moving speed of said image.

* * * * *